9610X
H. Souder.
Washing Machine
Patented Apr. 21, 1836.
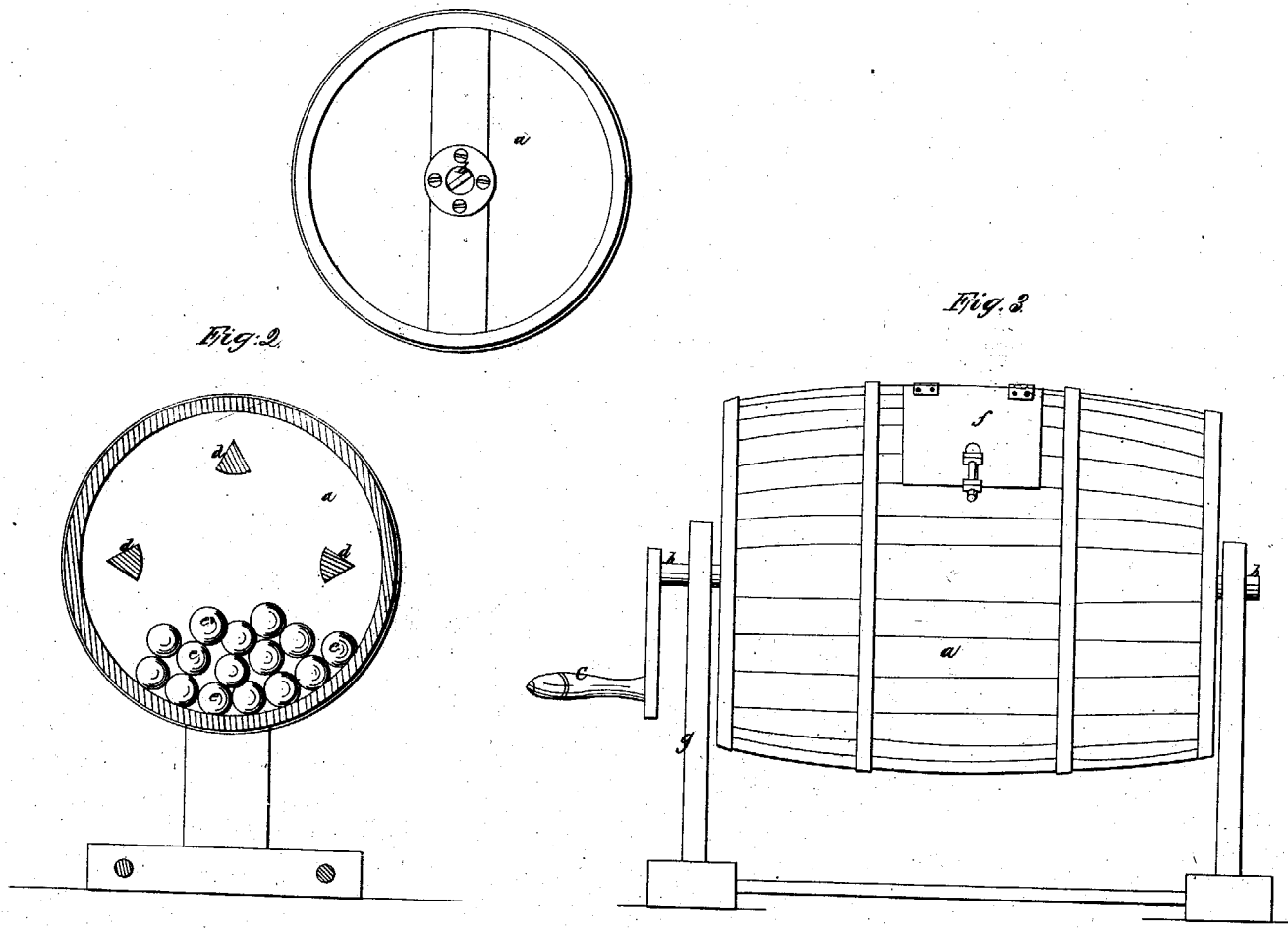

April 21, 1836 9610X

No 10
Apr. 21. 1836 85

Henry Souder, Lancaster Co. Pa.

Letters Patent.

The Schedule referred to in these Letters Patent and making part of the same containing a description in the words of the said Henry Souder, himself of his improvement "in the Washing Machine."

To all to whom these presents shall come.

Be it known that I Henry Souder, of [illegible] Township, Lancaster County and State of Pennsylvania have invented a new and useful improvement in the manner of washing clothes, called "Souders Washing Machine", and that the following is a full and exact description of the construction and operation of the said Machine as invented by me.

A Vessel is made of staves in the form of a barrel slightly bulged two feet in length and twenty two inches in diameter, having a gudgeon firmly fixed on the outside of each end on which it turns, with a crank on one of the gudgeons for the purpose of turning. Within are three [illegible] slat bars called the carriers of two and an half inches in breadth and three fourths of an inch in thickness firmly fixed at equal distances from each other, with one of their edges against the side and rounded on the other edge. Fifteen balls, made of hard, heavy wood of three different sizes, five, of four inches in diameter, five of three inches and five of two inches diameter or thereabouts are put into the vessel with the clothes. An opening is made in one side of the vessel to admit the pieces intended to be cleansed, with a valve working on hinges and made tapering so as to close the opening when dry or when not swelled. The vessel is placed on a

[illegible]

proper frame or stand, on which it is turned by means of the crank. This revolution of the vessel causes the balls to mingle and work in among the clothes and this produces the effect desired. One of the particular advantages of this vessel is, that from its closeness the steam is confined and the water kept to its proper degree of heat during the operation.

The inventor is not confined to the particular size above mentioned of the vessel - balls - or number and dimensions of the balls.

Witnesses
[illegible] [illegible]
Saml Dale

[illegible]

Henry [illegible]

390 [illegible]

Drawing mark [illegible]